United States Patent [19]

Swenson

[11] 4,431,202
[45] Feb. 14, 1984

[54] PIVOTED JAW MEMBERS

[75] Inventor: Henry F. Swenson, Roseland, N.J.

[73] Assignee: J. & S. Tool Company, Livingston, N.J.

[21] Appl. No.: 365,799

[22] Filed: Apr. 5, 1982

[51] Int. Cl.³ ............................................. B23B 31/18
[52] U.S. Cl. ..................................... 279/106; 279/123
[58] Field of Search ....................... 279/123, 106, 110; 269/134, 135, 150, 216, 237, 257

[56] References Cited

U.S. PATENT DOCUMENTS

| | | | |
|---|---|---|---|
| 2,712,449 | 7/1955 | Grobey | 279/106 |
| 2,811,771 | 11/1957 | Ericsson | 269/134 |
| 2,857,167 | 10/1958 | Smith | 279/106 |
| 2,873,653 | 2/1959 | Wilson | 269/134 |
| 3,020,041 | 2/1962 | Peterson | 269/135 |
| 3,056,609 | 10/1962 | Buck | 279/106 |
| 3,099,457 | 7/1963 | Hohwart | 279/123 |
| 3,166,336 | 1/1965 | Goodrum | 279/123 |
| 3,512,769 | 5/1970 | Pendry | 269/135 |
| 3,679,221 | 7/1972 | Behrens | 279/123 |
| 4,353,561 | 10/1982 | Peterson | 279/123 |

FOREIGN PATENT DOCUMENTS

| | | | |
|---|---|---|---|
| 1004449 | of 1957 | Fed. Rep. of Germany | 279/123 |
| 2153662 | of 1973 | Fed. Rep. of Germany | 279/123 |

Primary Examiner—William R. Briggs
Assistant Examiner—Daniel Howell
Attorney, Agent, or Firm—Ralph R. Roberts

[57] ABSTRACT

This invention pertains to an auxiliary jaw which is adapted to be affixed to a movable member and as this movable member is advanced to and from a workpiece to grip and hold this workpiece when and while the auxiliary jaw is advanced. This auxiliary jaw includes a pivoted jaw member carried by a support member which is preferably secured to the movable member by cap screws. The pivoted jaw member engages the surface portion of the workpiece in local areas as it exerts a gripping force urges the workpiece toward the support surface. Three configurations of jaw assemblies are shown. Each has a pivoted jaw with one configuration supporting the workpiece above the pivoted jaw. In a second configuration the support as a pin means is below the pivoted jaw and in yet a third configuration the pivoted jaws are movable toward and to a support disk for multiple workpieces. Soft jaws, hardened jaws and bias means may be used to bring the pivoted jaw to the desired condition. A cap screw retains the pivoted jaw to the support member and the pivot is at and on the upper extent of the support. This auxiliary jaw may be attached to any work table but is usually used with a chuck body on a lathe. The movable member is conventionally a T-member slidable in a T-slot in the chuck body. This auxiliary jaw may be used with independent jaws or self-centering jaws moved by a scroll plate.

21 Claims, 15 Drawing Figures

PIVOTED JAW MEMBERS

BACKGROUND OF THE INVENTION

1. Field of the Invention

With reference to the classification of art as established in and by the U.S. Patent and Trademark Office this invention is believed to be found in the class entitled, "Work Holders" (Class 269) and in the subclass therein entitled, "angularly alignable" (subclass 257) and in the subclass entitled, "attachments and/or inserts" (subclass 258).

2. Description of the Prior Art

A pre-Ex search was made of the art pertaining to jaw members that are mountable on movable chuck jaws. In particular, patents directed to a hold-down action were noted and added jaw members used with a scroll plate were also noted. In the course of this search the following patents were noted: U.S. Pat. No. 2,584,062 as issued to Stone on Jan. 29, 1952 in which the jaws of a vise are pivotally retained but the jaws have the pivot pin disposed below the hardened face portions. This showing is for a vise and not a scroll chuck; U.S. Pat. No. 1,120,649 to De Leeuw as issued on Dec. 8, 1914 also shows jaw inserts used with a vise. U.S. Pat. No. 2,725,793 to Camura as issued Dec. 6, 1955 shows an adjustable clamp with hardened sloped teeth portions. In FIGS. 1 and 3 of this patent is shown conventional T-slots formed in both worktables and in chucks. The U.S. Pat. No. 2,926,922 to Vermette as issued Mar. 1, 1960 shows a scroll chuck in which cylindrical inserted ends of facing portions are mounted. A drive spindle 10 is shown in FIGS. 1 and 2 and radial slots are shown for carrying the jaws and a scroll plate 42 is shown in this patent. The spring loaded ball is provided to urge the end into retaining condition. U.S. Pat. No. 3,001,292 to Anderson, et al., as issued Sept. 26, 1961 shows a removable jaw member with spring loading but is not disposed for use with a scroll chuck. U.S. Pat. No. 4,181,392 to Casler, et al., as issued Jan. 1, 1980 shows a clamp with pivoted end members having teeth that grip the workpiece. This jaw end is not applicable to a scroll or like chuck as contemplated in Applicant's invention.

The art pertains to mountable jaw members and several show or suggest that the hardened face have serrations and in some showings have pivot supports. The present invention provides mountable auxiliary jaw portions that are carried by the jaw portions of scroll chucks or by a movable jaw of an independently moved jaw in an independent chuck. These chucks are conventionally used with lathes in which a workpiece is held for turning to a desired contour or size. This invention provides attachable jaw members that provide a holding action and with the pivoted jaws hold the workpiece down against a determined stop. The jaws are shown as spring actuated and with a soft jaw the spring action is omitted. The jaw mounts are usually with a scroll-type chuck (conventional three jaw) but may be used with independently movable jaws (conventionally four jaw) in which the jaws are carried in T-grooved slots.

SUMMARY OF THE INVENTION

This invention may be summarized, at least in part, with reference to its objects. It is an object of this invention to provide, and it does provide, attachable jaw members having toothed portions that are pivotally movable to bring the tooth portion into engagement with the held workpiece and with a force applying action to automatically hold the workpiece down against a prepositioned stop. This jaw is mountable on a movable jaw support of a chuck used with a lathe. This attachable jaw may be used with self-centering (scroll actuated) and independently moved chuck jaws.

It is a further object of this invention to provide, and it does provide, auxiliary jaw portions which include pivoted jaw segment with the pivot at the top of a support portion so that the jaw segment in its gripping action provides a downward actuation. The auxiliary jaw portions are each retained on a movable jaw by key means and securing cap screws.

In brief, the auxiliary jaw includes a pivoted member that is pivotally mounted at the top of a support member. This pivot is adapted to cause the face of the jaw to move downwardly as the pivoted portion is moved into a gripping condition. Adjustable stop members are provided to retain the workpiece in the desired position during the gripping thereof. The pivoted jaw member is usually spring actuated away from its supporting member. The auxiliary jaw portions are carried on and by movable jaw segments which may be a self-centering scroll plate-type chuck or may be an independent jaw chuck. The movable jaw segments are conventionally carried in T-slots in the chuck body. The auxiliary jaws are shown as interior gripping, exterior gripping or soft jaw members adapted to grip special workpieces. Stop means are provided for each workpiece. Conventionally the jaw members include hardened and serrated jaw portions but soft jaws, when provided, are machined to grip these special workpieces.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen specific embodiments of pivoted jaw members mountable on movable chuck jaws as adopted for use with workpieces to be retained on lathe-type apparatus and showing a preferred means for constructing these auxiliary jaw members. These specific embodiments have been chosen for the purposes of illustration and description as shown in the accompanying drawings wherein:

In the following description and in the claims various details are identified by specific names for convenience. These names are intended to be generic in their application. Corresponding reference characters refer to like members throughout the several figures of the drawings.

Figure 1:
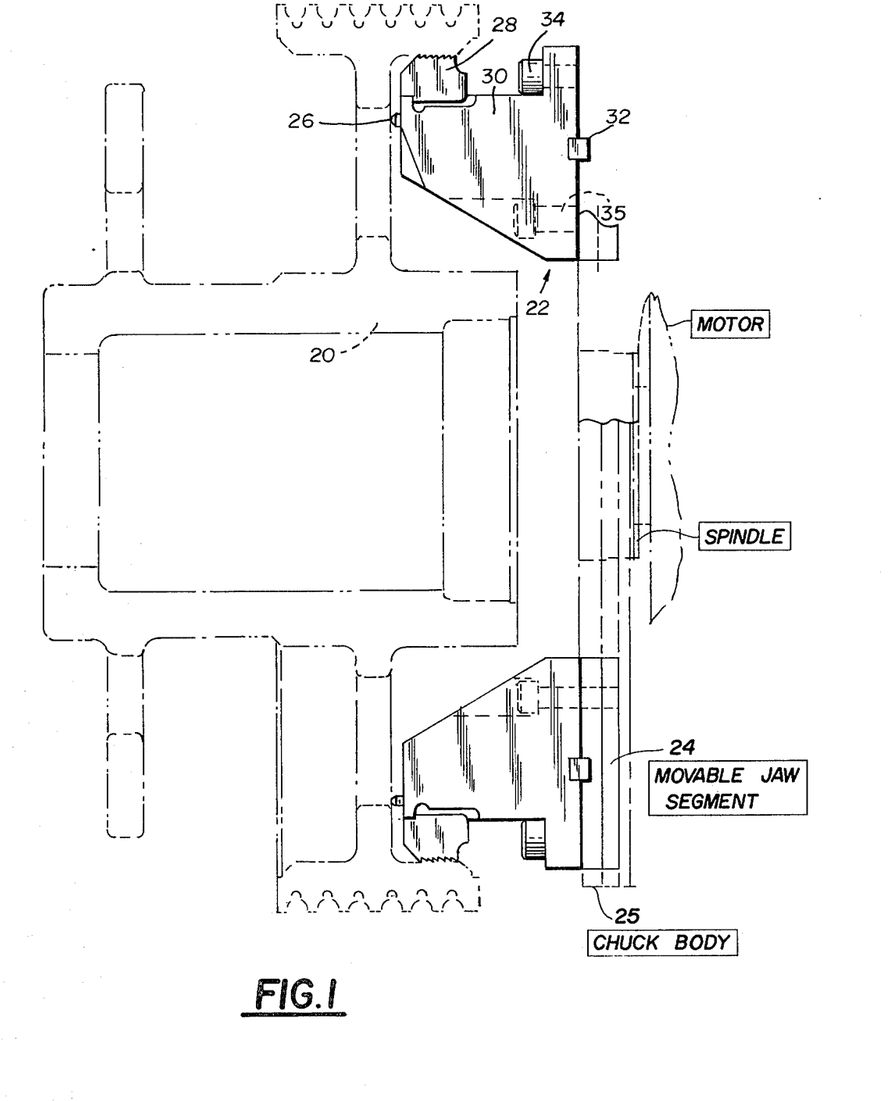
FIG. 1 represents a sectional side view, partly diagrammatic, and showing auxiliary chuck jaw members that are mountable on movable jaw segments of a chuck, these auxiliary jaws providing work limit stops and downward automatically actuated jaw portions.
Figure 2:
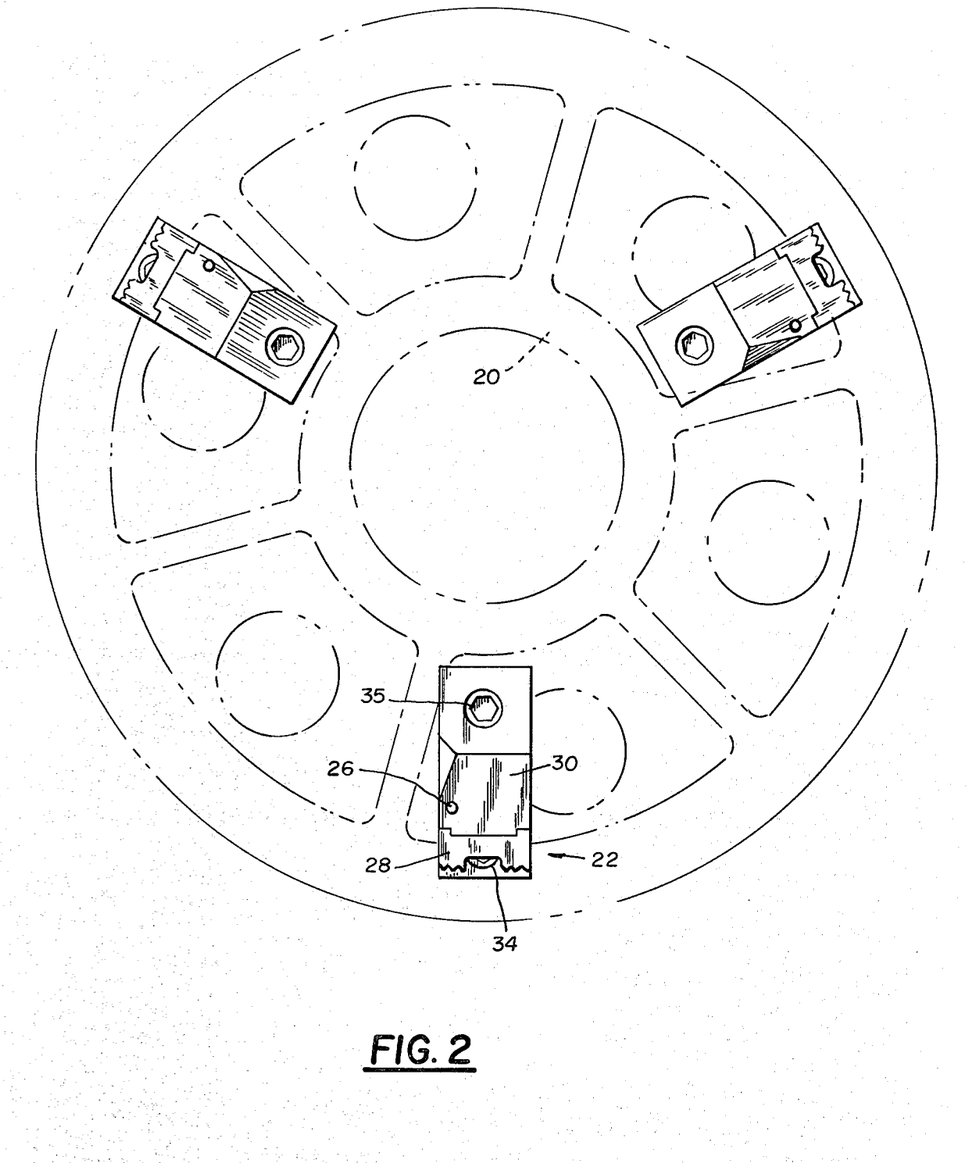
FIG. 2 represents a plan view, partly diagrammatic of the auxiliary chuck jaw as used in the assembly of FIG. 1.

DETAILED DESCRIPTION OF FIGS. 1 AND 2

Referring now to the embodiment as shown in FIGS. 1 and 2, a workpiece 20 is shown in phantom outline and is centered and rotated by a plurality of auxiliary jaw members 22. These jaw members are supported on movable jaw segments 24. Conventionally a chuck has three, four, or more jaws in which the movable jaw segments 24 are mounted and movable in T-slots in the chuck body 25. The movable jaw segments 24 depicted in phantom outline are each carried in a T-slot in the chuck body 25 also in phantom outline. The motor and spindle is shown by a label and the chuck body, spindle and T-slot are found in many patents including Vermette above noted. These auxiliary jaw members 22 each have an adjustable supporting pin 26 which engages the workpiece to support the workpiece 20 at a determined height above the body 25. The jaw members include pivoted work engaging jaw portions 28 and a support member 30. To locate and retain the support member 30 to the movable jaw 24 there is provided a key 32 which is a snug fit in both the movable jaw segment 24 and also in a groove formed in the support member 30. Cap screws 34 and 35 are disposed to enter into tapped holes in the segment 24 and retain the support member 30 in a preferred position. These cap screws are passed into and through bored holes in this support block, more fully described in FIGS. 6, 7 and 8.

As seen in FIG. 2, this embodiment contemplates the use of three jaw holding members 22 but four may be provided if desired since chucks are made with three or more movable jaws. Many chucks utilize a scroll plate for moving the segments 24 but this does not preclude the use of a universal chuck with each jaw portion independently moved by a rotated screw member. Whatever the method of motion, the auxiliary jaw member 22 is fixedly secured to the movable chuck jaw member 24.

Figure 3:
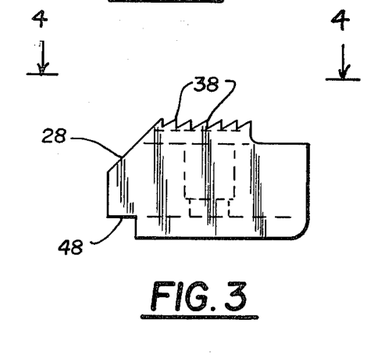
FIG. 3 represents a side view, partly diagrammatic and showing a pivotally actuated jaw portion with serrated teeth.
Figures 4, 9:
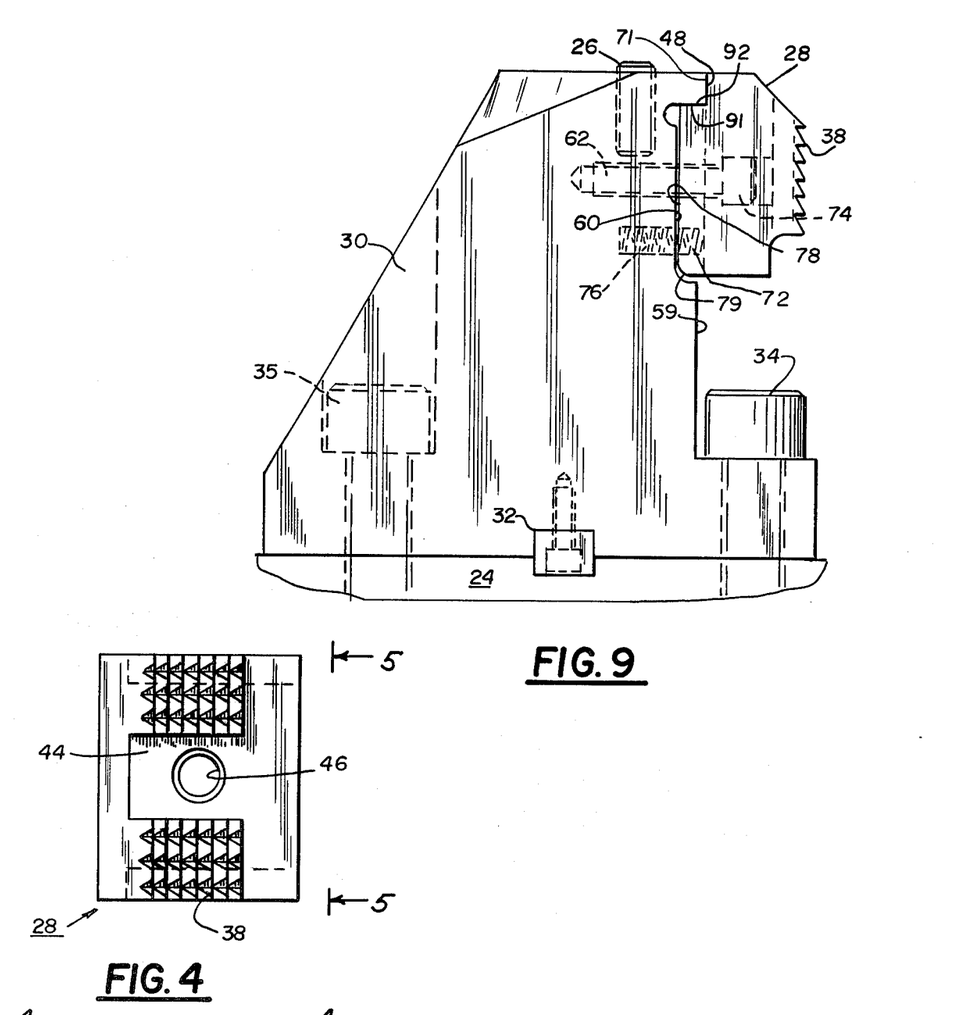
FIG. 4 represents a plan view of the jaw portion of FIG. 3, this view taken on the line 4—4 thereof and looking in the direction of the arrows.
FIG. 9 represents a side view, partly diagrammatic and showing the jaw portion of FIG. 3 as mounted in the support member of FIG. 6.
Figure 5:
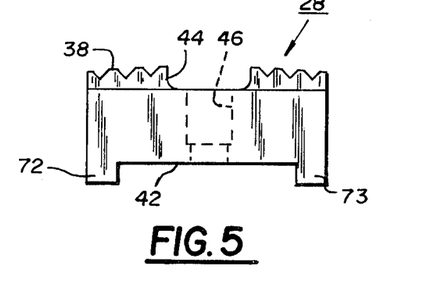
FIG. 5 represents an end view of the jaw portion of FIG. 3, this view taken on the line 5—5 thereof and looking in the direction of the arrows.

Jaw Clamp of FIGS. 3, 4 and 5

Referring next to FIGS. 3, 4 and 5, it is to be noted that portions 28 have serrated teeth portions 38 which preferably protrude and these portions are usually hardened steel. These teeth portions 38 are integral with a body portion 28 having a cutout or recess 42 adapted to mate with the support member 30 to be hereinafter more fully described. As this jaw portion 28 is disposed to engage the inside of a circular component this serrated tooth portion 38 is made with an arc substantially to conform to the interior diameter of the workpiece to be held. As seen in FIG. 5, this serrated and gripping portion 38 is shown with a relief 44 which is more-or-less centrally located and in this relief is formed a drilled and counterbored hole for a socket head screw. This drilled and counterbored hole identified as 46 is in the front or serrated face of the jaw portion 28.

It is to be noted that the serrated tooth portion 38 is sized to suit the workpiece, in other words the serrated portion may be very narrow for gripping certain areas and substantially full depth in other jaw members. In the present invention shown in FIG. 3 this serrated portion occupies about one-half of the face or depth of the face portion. It is to be noted that only the serrated jaw portion is formed with an arcuate configuration (convex) to accommodate a circular shoulder of the workpiece being held. It is to be noted that in the configuration of FIG. 5 the serrated jaws 38 are also formed with an up and down vertical cutout to provide short tooth segments which grip the workpiece. A transverse L-shaped relief 48 is provided in the rear portion of the jaw to provide one face of a pivot and provide a shoulder stop against unwanted upward movement of the jaw and pivot motion that is described hereinafter.

Figure 6:
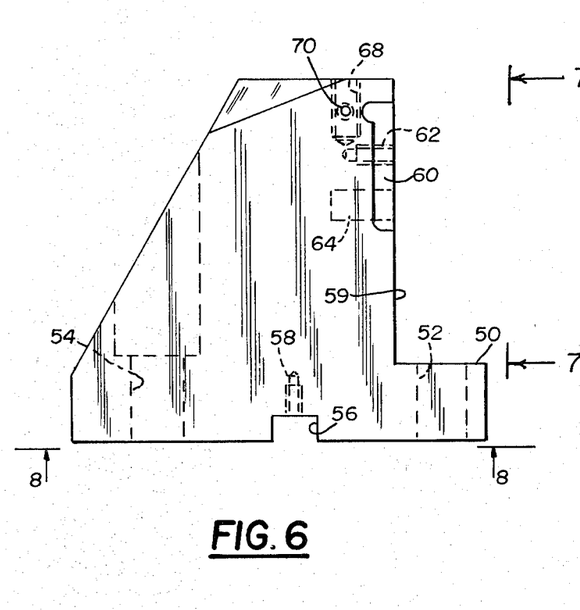
FIG. 6 represents a side view, partly diagrammatic and showing the jaw support member for the pivoted jaw portion of FIG. 3.
Figure 7:
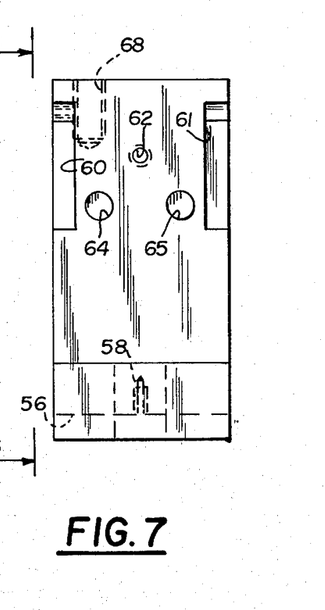
FIG. 7 represents an end view of the support of FIG. 6, this view taken on the line 7—7 thereof and looking in the direction of the arrows.
Figure 8:
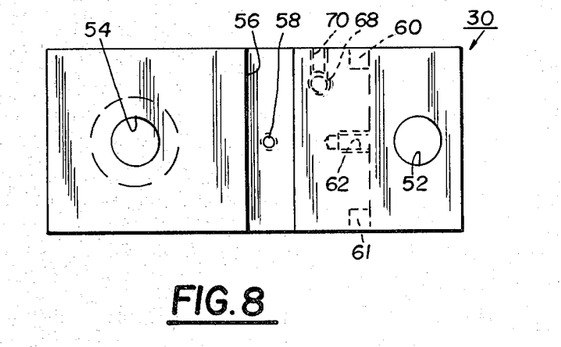
FIG. 8 represents a bottom view of the support of FIG. 6, this view taken on the line 8—8 thereof and looking in the direction of the arrows.

Embodiment of FIGS. 6, 7 and 8

In FIGS. 6, 7 and 8 the preferred member 30 is shown. This member 30 is formed with a front shoulder portion 50 in which there is formed an aperture 52 for a through bolt or cap screw 34 as seen in FIG. 1. A counterbored hole 54 is formed in the opposite or outer portion of the support member 30. This counterbored hole 54 is sized to accommodate the cap screw 35 as seen in FIG. 1. A notch 56 is formed to receive and retain key 32 as shown in FIG. 1. This key is retained by a cap screw whose head is retained in the key 32 and whose shank is retained in a threaded aperture 58 formed in this support member. By means of this cap screw, not shown or identified in this FIG., the key 32 is retained in this notch.

In a forward face portion 59 of this block is formed two like recesses 60 and 61 adapted to retain the ears of the jaw when mounted therebetween. A tapped hole 62 is also formed in this forward face and is adapted to retain the shank of a screw, not shown, which is mounted in the counterbored recess 46 of the jaw 28. Also formed in this face are blind holes 64 and 65 for receiving a spring to be later identified. A threaded hole 68 extending from the top surface is adapted to receive and retain a threaded support pin 26 as seen in FIG. 1. A tapped hole 70 is adapted to enter the mid-portion of this threaded hole 68 and mountable therein is a set screw with a non-mar tip or end so as to not deform the thread portion of the support pin 26 after it has been adjusted to support the workpiece.

The bottom view as in FIG. 8 shows the arrangement and configuration of the transverse key notch and the hole aperture provided in the support member 30.

Assembly of FIG. 9

In FIG. 9 is depicted the assembly of the pivoted jaw portion 28 into the support member 30. In the showing, which is merely representative of the auxiliary jaw member, it is to be noted that the transverse relief 48 engages a protruding upper rib portion 71 which as viewed extends to the right. This rib portion 71 is an integral or a fixedly secured portion of the support member 30 and is a continuation of the front face or surface 59 of the support member 30. Ear portions 72 and 73 which are formed when the relief 44 is made in the jaw portion 28 is a slidable fit into the recesses 60 and 61 in the support member 30. Cap screw 74 as seen in dashed outline enters and is retained in the tapped hole 62 in the support member 30. Compression springs 76 are of like size and bias force and one of each is inserted in the blind holes 64 and 65 in the face of support member 30. The jaw portion 28 is made with its rear face or surface 78 disposed to provide about one thirty-second of an inch clearance between surface 78 and the milled face 79 of the recesses 60 and 61. The cap screw 74 is adjusted so that the springs 76 urge the jaw portion forwardly to the desired position. As seen in FIG. 9 this pivoted motion is about one thirty-second of an inch but may be made more or less to suit the application.

Use and Operation of the Pivoted Auxiliary Jaw

The assembly of the auxiliary pivoted chuck jaw is shown diagrammatically in FIG. 9. The movable jaw 24 of the supporting chuck is formed with grooves to receive and retain the key 32 which precisely positions the auxiliary pivoted jaw to the movable jaw 24 in the chuck body. Cap screws 34 and 35 enter and are retained in threaded holes in each movable jaw and are tightened in place to retain this pivoted auxiliary jaw to the movable jaw. As shown, this auxiliary jaw member is adapted to engage and retain the interior diameter portion of a workpiece 20. The supporting pins 26 are conventionally headless socket-type set screws which are adjusted up and down to establish the desired supporting plane for the workpiece.

Springs 76 are mounted in the blind holes 64 and 65 and provide the desired outward bias to urge the lower portion of the pivoted jaw portion 28 outwardly. Against the bias of the compression springs the cap screw 72 is turned in or out to adjust the pivoted jaw portion 28 into the desired position. The cap screw 74 is adjusted so that jaw portion 28 is at an angle with its lower portion extending forwardly when the workpiece 20 is positioned on the jaws. As the jaw portions 28 are moved against the workpiece the lower portion of the jaw is moved against the bias and toward the support 30. In a gripping condition the rear surface 78 is about parallel to face 79. The pivoted jaw is substantially vertical when the spindle is vertical and horizontal when the spindle is horizontal. To grip the workpiece 20 the support member 30 is moved toward said workpiece whereat the pivoted jaw portion 28 and its serrated tooth portion 38 engages a surface of said workpiece and with the forward motion the workpiece is snugly moved to and held against the stop pin 26. It is, of course, realized that the supported and pivoted jaw portion may be reversed to provide exterior gripping and the jaw as to its serrated holding configuration may be changed as in the other embodiments.

Figure 10:
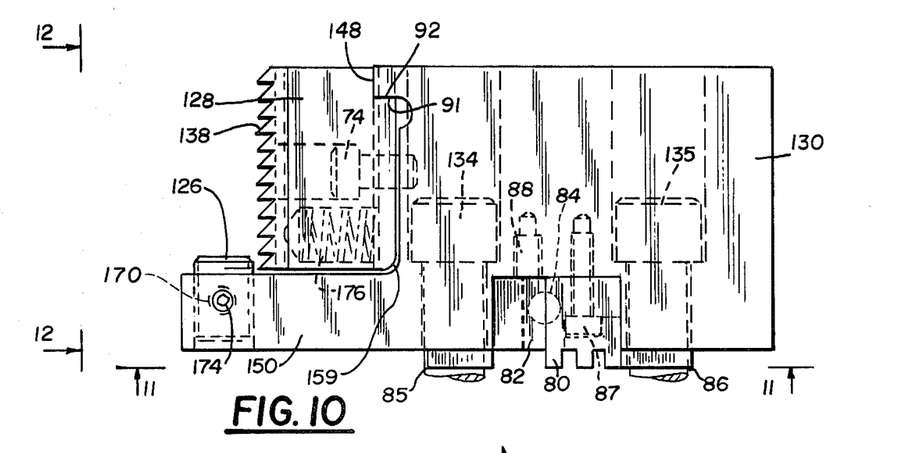
FIGS. 10, 11 and 12 represent side, bottom and end views of an auxiliary chuck jaw with a work stop below the pivoted jaw portion, this assembly adapted for both inner and outer gripping and showing an adjustable engaging means.
Figure 11:
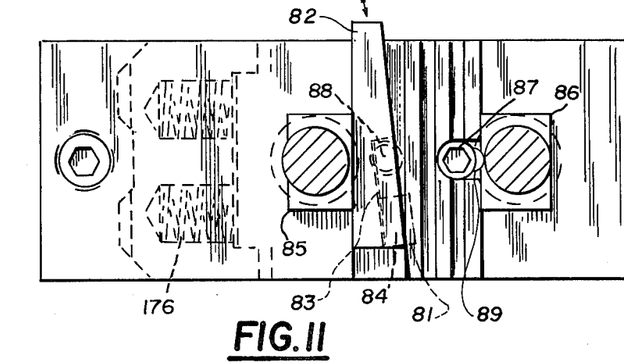
Figure 12:
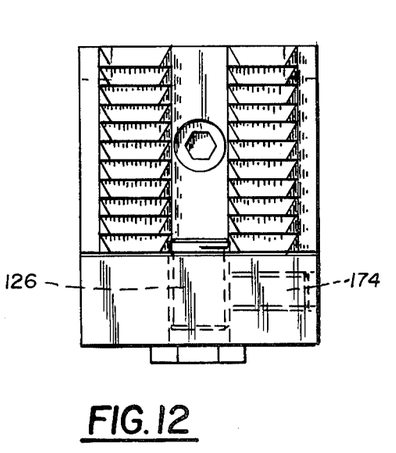

Embodiments of FIGS. 10, 11 and 12

The embodiment of the auxiliary chuck jaw as shown in FIGS. 10, 11 and 12 provides for holding of a workpiece on its outer or exterior diameter. In this embodiment the pivoted jaw portion as carried on the support member is very similar to the embodiment above described but is for gripping the exterior diameter of a workpiece. A support 130 is secured by cap screws 134 and 135 to a movable jaw carried by and in a body as in FIG. 1. This assembly as in FIG. 10 has an adjustable stop pin 126 carried below serrated face 138 of a pivoted jaw portion 128. As in FIG. 9, this pivoted jaw portion is retained in position by a cap screw 74. Springs 176 are compression springs and are retained in blind holes in the jaw member. The pivot action and support of this jaw portion with the determined clearance is like in FIG. 9 above. Stop pin 126 is secured in its adjusted condition by a non-mar screw 174. The pivoted actuation of the jaw portion 128 is in the manner above described in connection with FIG. 9.

As seen in FIGS. 10 and 11, an alternate positioning means for securing the jaw on a movable jaw is shown. The movable jaw carried by and in the chuck body has or may be provided with spider grooves into which key member 80 is secured. The support 130 has cap screws 134 and 135 which are loosely secured in threaded holes in the movable jaw. A pocket 81 is milled or formed in the tapered face of key member 80. A tapered wedge member 82 is moved back and forth as indicated by the arrows to precisely position the support 130 on the movable jaw. Set screw 84 provides an adjusted stop for this wedge member that is made with a five degree taper for precise adjustment. As seen in the bottom view of FIG. 11 and the side view of FIG. 10 there is provided guide portions 85 and 86 which align the support 130 with the movable jaw. Cap screw 87 holds member 80 in the desired position and wedge portion 82 is urged into a secured condition by set screw 84. Tapped hole 88 is used when screw 87 is removed and the members 80 and 82 reversed when and where desired. When such reversal is made screw 87 is removed and members 80 and 82 are removed and reversed. The tapped hole 88 is now substantially in alignment with the counterbored aperture and screw 87 is now entered and partially tightened in threaded hole 88. Screw 84 is adjusted as to the desired positioning of the member 80 and 82 and screw 87 is now tightened to effect final retention.

Use and Operation of the Embodiment of FIGS. 10, 11 and 12

This embodiment contemplates a jaw portion 128 that is pivotally retained by a support member 130. The support pin 126 is to the front and below the serrated face portion 138 of the jaw portion. The serrated face 138 of the jaw portion 128 is shown as substantially a full depth but may be made to suit. The key member 80 and the taper wedge member 82 are sized and configured to mate with like formed portions of a movable member. Multiple grooves are provided in the mating support, not shown, but a key retainer is merely a matter of preference. As in the assembly of FIG. 9 the jaw member is adapted to be pivoted at its upper edge so as to insure that forward movement of the support causes the jaw to provide a downward movement as the jaw exerts its gripping force. The positioning of the tapered wedge 82 is by screw 84 and after the desired position is achieved screw 87 is tightened to maintain this position.

It is to be noted that the members 80 and 82 may be removed and reversed if desired. Springs 176 are contemplated to provide a bias against which the screw 74 is adjusted to bring the jaw assembly to the desired adjustment. Mating vertical surfaces 148 and 159 of the jaw and support also mate with and insure that the actuation of surface 91 and 92 on the jaw and support member prevents unwanted lifting and displacing movement of the jaw 128 for the support 130. The supporting pin 126, after adjustment, is retained in the adjusted condition by a socket headed screw 174 carried in the tapped hole 170.

Figure 13:
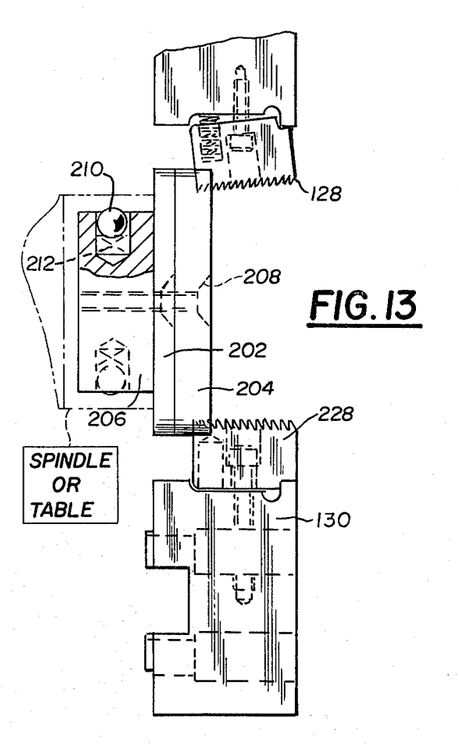
FIGS. 13, 14 and 15 represent another jaw configuration as used to retain spiders for machining as a group, this showing providing jaws that are soft and bored to size or with hardened portions that are used for special applications.
Figure 14:
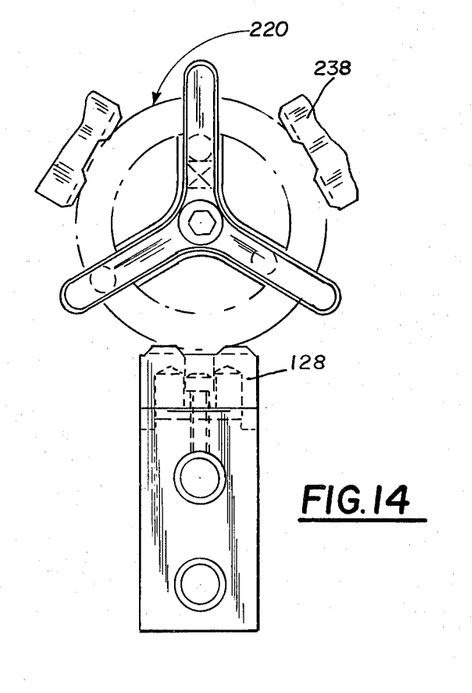
Figure 15:
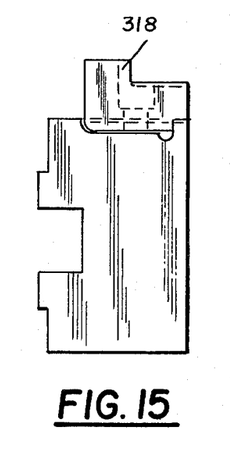

Embodiment of FIGS. 13, 14 and 15

Referring next and finally to the apparatus as shown in the embodiment of FIGS. 13, 14 and 15, it is to be noted that a chuck similar to that of FIG. 10 may be used to retain a multiplicity of like workpieces for simultaneous machine operations. As in all other shown embodiments, the jaw is pivoted at its upper extent with the jaw portion movable into a downward gripping actuation as the auxiliary jaw is moved into gripping condition. The assembly of this chuck jaw as to the spring actuated jaw includes the jaw 128, support 130 and hold-down cap screws 134 and 135, as used in the embodiment of FIG. 10.

Rather than an adjustable work stop pin as in FIG. 10 there is shown a work stop 202 or if desired a thicker work stop 204, each of which is supported and freely rotatable with a retained plug 206. Screw 208 is used to hold the disk 204 to the plug 206. This plug is depicted as having a plurality of balls 210 urged outwardly by spring means 212. In the manner of a retained ball detent these balls are retained in bored holes 213. A table or spindle 214 is indicated in phantom outline and is conventional in vertical boring mills and larger horizontal lathes which have a central cavity in such a table or spindle. The stop 202, or if desired, plus stop 204 is positioned immediately above or outer of the table or end of spindle 214. The jaw 128, rather than being spring biased, may have no spring means and when this spring is absent the resulting assembly is thus identified as 228. Otherwise, the jaw is pivoted and is as in FIG. 10.

In FIG. 14 the jaws 128 are shown as movable into the gripping condition whereat the extending jaws 238 engage and hold a workpiece 220 on two obtuse faces of the workpiece. Hydraulic actuation moves the jaws so as to engage the workpiece at the inner obtuse face thereof.

In FIG. 15 the jaw member 318 is shown with a soft jaw which may be bored to the desired diameter. This jaw is also pivoted as above but with soft jaws there is provided no spring bias. The several embodiments contemplate that a lathe is used to machine a workpiece. The lathe, whether vertical (boring mill) or horizontal, has movable chuck jaws usually with a chuck body carried on the lathe spindle. This movable jaw is carried in a guideway that is usually a T-slot. The improvements provided by the present embodiments are auxiliary jaw members that have pivoted jaw portions in which the pivot is at the outer extreme so that the jaw when moved into a gripping condition of the workpiece provides a hold down action and results in a holding of the workpiece against the body.

The pivot is simply but effectively made. Retaining ears are provided either on the pivoted jaw and with a mating tongue on the support or vise versa. There is provided a ledge portion on the jaw and a mating shoulder portion on the support that establishes and prevents movement of the jaw toward the chuck body. An adjusting screw retains the pivoted jaw in the desired mating position on the support while permitting movement of the pivoted jaw toward the retaining support. The pivoted jaw may have a spring or like bias to urge the pivoted jaw away from the support but the pivoted jaw may have no bias and may be a soft jaw bored to a given diameter.

It is to be noted that the pivoted jaw embodiment above shown are used mainly on lathes but may be used on milling machines whereat the workpiece is gripped on its sides or edges and held down to the table. These jaws may be arranged as opposed pairs and may be as few as two. The embodiments shown and contemplated require a movable means and with the advancing motion the pivoted jaw is moved into a gripping condition and provides a down holding actuation with the same motion.

Terms such as "left", "right", "up", "down". "bottom", "top", "front", "back", "in", "out" and the like are applicable to the embodiments shown and described in conjunction with the drawings. These terms are merely for the purposes of description and do not necessarily apply to the position in which the auxiliary chuck jaw may be constructed or used.

While particular embodiments of the jaw assemblies have been described and shown it is to be understood the invention is not limited thereto and protection is sought to the broadest extent the prior art allows.

What is claimed is:

1. An auxiliary jaw adapted to be affixed to a reciprocably movable member and providing mounting means for said jaw which is advanced toward and from a workpiece to grip said workpiece and as this jaw is advanced provides a gripping action combined with a hold-down actuation, this auxiliary jaw arranged to act with an opposed abutting member to grip the workpiece, the auxiliary jaw carried by said movable member in a chuck, worktable and the like, this auxiliary jaw including:
   (a) a support member provided with securing means by which said support member is fastened at its bottom surface to the reciprocably movable member and including a positioning means formed in both support member and the movable member;
   (b) at least one receiving and retaining means formed in an upper portion of the support member including a fixed lip portion provided with a shoulder generally parallel to the bottom surface of the support member and with at least one guide portion disposed below the lip portion and adjacent thereto;
   (c) a pivoted jaw member having a face portion adapted to engage a surface portion of a workpiece, said jaw carried by retaining means formed in and provided by the support member and guided by said guide portion to move in a plane generally parallel to the bottom surface of the support member, this jaw member having a pivot configuration which includes at least one portion adapted to slidably engage a compatibly formed portion on the support member to provide said guide portion, the jaw member having a recess formed by transverse surfaces at the corner adjacent the support member lip and positioned to receive the lip portion on the support so that in operating condition the lip and jaw member engage each other to provide actuation while the recess and the shoulder are engaged to prevent upward displacement of the jaw member as it is mounted and used with the support member, and (d) securing means retained in the support member and engaging the jaw so as to hold the jaw member with limited movement relative to said support member at a selected position while permitting the pivoted movement of the lower end of the jaw member toward the support member, the fulcrum of the pivoted movement of the assembled auxiliary jaw being provided at the lip of the support member so that the lower jaw member portion has a determined clearance from the adjacent support member surface and may be pivoted around the fulcrum at said lip to provide the desired hold-down actuation.

2. An auxiliary jaw as in claim 1 in which the pivoted jaw member is of hardened steel and with the gripping face thereof including a serrated tooth portion.

3. An auxiliary jaw as in claim 1 in which the pivoted jaw member is retained by a cap screw adjustably mounted in a threaded hole in the support member and with the head of this cap screw mounted in a counterbored aperture in the pivoted jaw member.

4. An auxiliary jaw as in claim 3 in which the guide portion includes forming the support member with receiving recesses in the outer extents of the support member and with the jaw member formed with ear portions sized and adapted for slidable retention in said recesses in the support member.

5. An auxiliary jaw as in claim 4 in which the lower portion of the pivoted jaw is biased outwardly by resilient means interposed between the inner face of the pivoted jaw member and the outer opposed face of the support member.

6. An auxiliary jaw as in claim 5 in which the bias is provided by at least one compression spring.

7. An auxiliary jaw as in claim 6 in which there is a pair of springs used with each auxiliary jaw assembly and each spring is carried in a blind hole.

8. An auxiliary jaw as in claim 7 in which the blind holes are formed in the support member.

9. An auxiliary jaw as in claim 1 in which the positioning means is a key carried in a groove formed in both the support means and movable means.

10. An auxiliary jaw as in claim 1 in which the pivoted jaw member is formed with a convex curve with an arc adapted to engage an inner diameter of the workpiece to be held.

11. An auxiliary jaw as in claim 1 in which the pivoted jaw member is of hardened metal with a serrated gripping face and with the jaw member biased outwardly by a retained spring interposed between the jaw and support and retained in the desired position by a cap screw mountable in a counterbored aperture and with said screw mounted in a threaded hole in the support member, this support member also provided with an adjustable support pin adapted to engage the workpiece at a selected position and maintain this workpiece at this selected position against the down holding action of the pivoted jaw member.

12. An auxiliary jaw as in claim 11 in which the adjustable support pin is carried above the gripping face of the jaw member.

13. An auxiliary jaw as in claim 12 in which the adjustable support pin is carried below the securing face of the pivoted jaw member.

14. An auxiliary jaw as in claim 1 in which there are at least three auxiliary jaw assemblies each jaw assembly is secured to a movable jaw segment and each movable jaw segment is carried in a retaining slot formed in a chuck body.

15. An auxiliary jaw as in claim 14 in which the retaining slot provided in the chuck body is a T-slot and the movable member is formed with a mating T-shape.

16. An auxiliary jaw as in claim 15 in which the chuck is a self-centering chuck in which the movable jaw members are moved by a rotatable scroll plate.

17. An auxiliary jaw as in claim 15 in which the movable jaw members are independently moved jaws, each jaw advanced and retracted by screw means conventional in chuck bodies.

18. An auxiliary jaw as in claim 15 in which the support member secured to the movable member is formed with at least two threaded holes and the auxiliary jaw support member is secured to said movable jaw segment by cap screws which enter and are tightened in these threaded holes in the movable jaw segment.

19. An auxiliary jaw as in claim 1 in which the pivot of the jaw member to the support member includes formed recesses into which extending ears on the pivoted jaw member are seated providing the desired stop for the upward face of the pivoted jaw member as it grips and holds the workpiece.

20. An auxiliary jaw as in claim 1 in which the support for the workpiece is a member attached by securing means to a plug adapted to be removable mounted in a circular recess in a rotatable body on a spindle of a lathe or the like.

21. An auxiliary jaw as in claim 20 in which the removable mounting of the plug includes at least three ball detents biased outwardly to provide a retaining condition.

* * * * *